United States Patent [19]

Insler et al.

[11] 3,751,587

[45] Aug. 7, 1973

[54] LASER PRINTING SYSTEM

[75] Inventors: Julius R. Insler, Bergenfeld; Allen R. Leslie, Baldwin; Ronald J. Vigneri, Midland Park, all of N.J.

[73] Assignee: Saxon Industries, Inc., New York, N.Y.

[22] Filed: Jan. 20, 1972

[21] Appl. No.: 219,239

[52] U.S. Cl. ........ 178/6.6 R, 178/6.6 A, 178/6.6 B, 178/6.7 R, 340/76 L, 350/161

[51] Int. Cl. ........ H04n 1/10

[58] Field of Search ........ 178/6.6 R, 6.6 A, 178/6.6 B, 6.7 R, 7.3 D, 6.6 P; 350/161; 346/76 L; 108; 340/173 AT, 173 YC, 173 LM

[56] References Cited

UNITED STATES PATENTS

| | | | |
|---|---|---|---|
| 3,479,453 | 11/1969 | Townsend | 178/6.7 R |
| 3,448,458 | 6/1969 | Carlson et al. | 340/173 LM |
| 3,461,229 | 8/1969 | Oppenheimer | 178/6.6 R |
| 3,475,760 | 10/1969 | Carlson | 340/173 LT |

*Primary Examiner*—James W. Moffitt
*Attorney*—Morton Amster, Stanley J. Yavner et al.

[57] ABSTRACT

A modulated laser beam developed in a non-contacting printing arrangement sweeps across an ink bearing carrier disposed adjacent a printing surface, e.g., an untreated paper sheet. In successive line sweeps, each slightly displaced from the prior sweep line, the incident laser beam selectively transfers printing materials, such as ink, from the carrier to the paper surface in accordance with the laser modulation intelligence. The modulator reduces or shutters the laser beam in such manner as to prevent ink transfer where printing is not desired and allows the laser beam to pass or directs the laser beam to points where printing is desired. Printing speed for the composite printing system directly depends upon the rate at which ink can be displaced from its carrier, and therefore ultimately upon laser power. In a copying machine context, the laser modulating information is developed by scanning the original document to be reproduced.

In accordance with the present invention, the laser beam is alternately accelerated and slowed with respect to the average sweep rate across the ink bearing carrier during printing to essentially dwell at such points on the carrier where it is desired that ink be displaced onto the printing surface during the sweep of a line trace. Accordingly, the power of the laser beam required to transfer ink is reduced, and thereby also permissible printing speeds are increased, by reason of the swell of the laser beam on the ink vis-a-vis that situation where the laser beam is swept at a constant speed acros the ink bearing carrier.

23 Claims, 8 Drawing Figures

Figure 1:
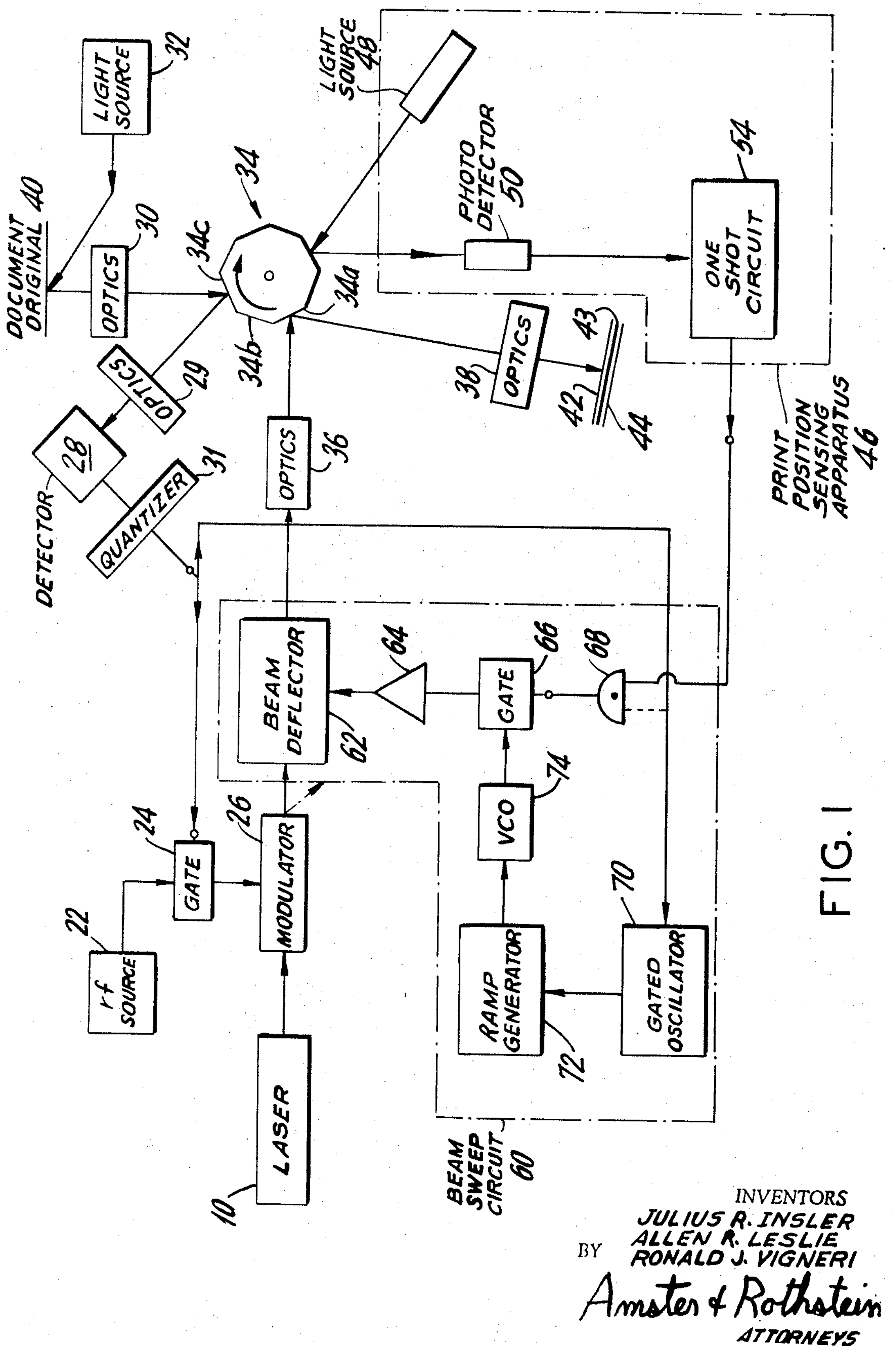

INVENTORS
JULIUS R. INSLER
ALLEN R. LESLIE
BY RONALD J. VIGNERI
Amster & Rothstein
ATTORNEYS INVENTORS
JULIUS R. INSLER
ALLEN R. LESLIE
RONALD J. VIGNERI
BY
Amster & Rothstein
ATTORNEYS

LASER PRINTING SYSTEM

DISCLOSURE OF INVENTION

This invention relates to non-contact printing and, more specifically, to rapidly operative laser printing apparatus.

In copending U.S. Pat. application Ser. No. 25,425 filed Apr. 3, 1970 and copending application Ser. No. 43,375 filed June 4, 1970 and now abandoned, each assigned to the assignee hereof, there is disclosed structure for effecting non-contact printing on an operand surface by cyclically sweeping a modulated laser beam across an inked surface (or other dye or pigment source) disposed adjacent an image receiving member. The laser modulation intelligence may be derived from a coincidentally operative document scanner in a copying machine context; or derived from a computer, data link, or communications channel; or may be derived from information stored in a retentive medium, such as a magnetic memory, on tape, or the like.

The apparatus has proven highly successful in producing clear images on any common printing surface, there being no requirement for special coatings or the like. Printing is effected by impinging sufficient laser beam energy upon a selected portion of the ink to transfer ink from the ink carrier to the printing surface as the laser beam sweeps across the ink surface. The printing operation thus in essence embodies a selective energy transfer from the laser beam to the ink source. Accordingly, the maximum permissible printing speed, corresponding to the maximum speed at which the laser beam can be swept across the pigment bearing surface, directly depends upon the available laser beam power.

As a general matter, the cost of a particular variety of laser and its associated equipment is directly related to the average output beam power capability of the laser. The available laser output beam power, in turn, is an important limiting factor for the printing rate of the laser printers contemplated herein.

It is thus an object of the present invention to provide improved laser printing apparatus.

More specifically, an object of the present invention is the provision of laser printing apparatus, wherein printing speed for a laser of any given available output power capability is markedly increased over that heretofore obtaining.

The above and other objects of the present invention are realized in specific, illustrative laser printing apparatus which includes structure for repetitively sweeping a modulated laser beam across a pigment (e.g., ink) bearing surface. Relatively slow translation orthogonal to that of the direction of the beam sweep is provided for the image receiving surface, e.g., an untreated paper sheet proximately disposed parallel to the ink bearing surface of the ink carrier for receiving ink selectively displaced therefrom by the laser beam.

To provide increased printing speed, the laser beam sweep speed is alternately decelerated and accelerated with respect to the average scan rate across the ink carrier during printing such that the beam effectively dwells at those points on the ink carrier from which ink is to be transferred during each line trace. Accordingly, more laser beam energy is absorbed by the ink areas corresponding to the discrete, beam dwell locations. Since permissible printing speed directly depends upon the amount of the laser beam energy transferred to the inked surface at those discrete points where printing is desired, the printing rate increases over that previously obtaining in continuous scan printing structures.

The above and other objects, features and advantages of the present invention will become more clear from a detailed description of a specific embodiment of the present invention, presented hereinbelow in conjunction with the accompanying drawing, in which:

FIG. 1 is a schematic block diagram of a laser printing arrangement embodying the principles of the present invention; and FIGS. 2A–2G are timing diagrams characterizing selected operative functions for the FIG. 1 arrangement.

Referring now to FIG. 1, there is shown non-contacting document reproducing apparatus employing a modulated laser beam printing mechanism. The underlying document copying principles and procedures effected by the FIG. 1 arrangement have been set forth in detail in the above identified copending applications, and will simply be summarized here. In its essential aspects, an original document 40 to be copied is illuminated by a light source 32. Incident light reflected by the document 40, corresponding to the pattern of printed matter thereon, is scanned by optics 30, a rapidly rotating multi-faceted reflecting scan wheel 34, optics 29 and detector 28. The document scanning process develops an electrical signal characterizing the presence or absence of printed matter during sequential line traces in one dimension across the document, e.g., horizontally. Successive scan lines are slightly displaced from one another in an orthogonal direction along the document, i.e., along its length. The vertical scan line separation depends upon the desired system parameters such as spot size, resolution, speed and the like.

Figures 2A, 2B, 2C, 2D, 2E, 2F:
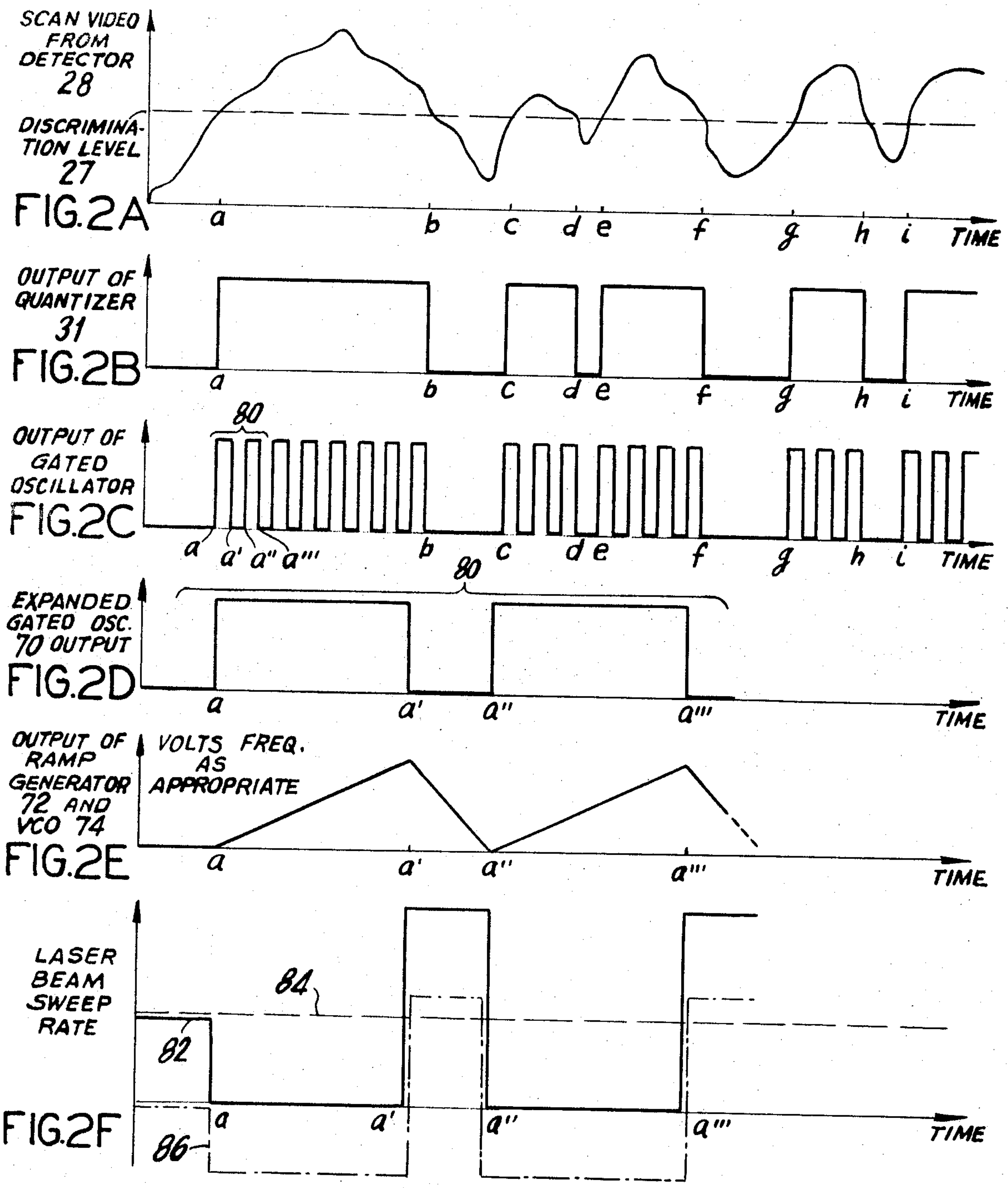

Horizontal scanning of the document 40 is effected by imaging light reflected from different points of the document 40 as each reflecting facet of the rotating scan wheel 34, the facet 34c for the scan wheel orientation shown in FIG. 1, changes the angle at which light is reflected. Scanning starts at a first edge of the document 40 for imaging on to the detector 28, and continuously proceeds completely across the document 40 as the facet rotates until the facet passes out of useful operative position. The next line scan is effected as the following facet—element 34*b* in the drawing, rotates into an operative position to couple via the optical chain incident light reflected from the document 40 on to the light detector 28. Vertical relative movement of the document with respect to the operative line scan may be effected by physically moving the document, or by optical structure operable to move the scan line in the vertical direction. The net output of the document scanning procedure is an output voltage pattern (see, for example, FIG. 2A) or current pattern provided by the detector 28 which characterizes the presence or absence of printed matter on the document 40. If the detector provides an analog output, this output is then converted to binary form by a quantizer circuit 31, e.g., a Schmitt trigger having a threshold set at the black-white discrimination level. The quantized signal is depicted in FIG. 2B. If grey scale discrimination is desired, more than one discrimination threshold can be provided combined with probability circuits.

To effect printing generally, and omitting for the moment laser beam deflection circuitry 60 considered hereinbelow, the FIG. 1 arrangement employs a laser 10 of any conventional construction which supplies an output beam selectively passing via a beam intensity modulator 26, optics 36, a reflecting facet of the scan wheel 34, and optics 38 to a pigment carrier 42 having a pigment (printing material) 43 disposed thereon, e.g., ink on glass, mylar or the like. Disposed immediately behind the inked carrier is an operand printing surface 44, e.g., a sheet of conventional, untreated paper adapted to receive the reproduction of the scanned document 40.

The modulator 26 varies the amplitude of the laser beam in accordance with a control signal representing the graphic information at the output of the quantizer 31. The modulated laser beam is then horizontally swept across the pigment surface 43 in the printing operation in synchronization with the document scanning operation of the original document 40. More specifically, different reflective facets of the scan wheel 34 sweep the modulated laser beam across the inked surface 43 in synchronization with document scanning in a periodic sequence of horizontal scan traces. Synchronization between document scanning and printing is maintained once the system is properly aligned, since the laser 10 and the target 42–44, and the document 40 and the detector 28, along with their ancillary optical elements, are physically fixed in position and are respectively coupled by facets of the same scan wheel 34.

Modulation of the laser beam is performed by a modulator 26 of any known type, e.g., an acousto-optic modulator unit which diffracts a portion of an incident laser beam to a particular output exit angle depending upon the presence or absence of input radio frequency energy at a control port. Thus, the composite modulation structure shown in FIG. 1 includes a gate 24 for selectively coupling radio frequency energy from a source 22 thereof to the modulator 26 under control of the output signal from the elements 28 and 31. In one mode of operation, when black information is detected on the document, the gate 24 blocks the RF energy such that the laser beam passes unattenuated through the modulator 26 and optics 36 to impinge upon the ink surface 43. Correspondingly, when a white area is encountered, the output of the detector 28 via quantizer 31 opens the gate 24 which passes RF energy to the modulator 26. The laser beam is thus deflected, as schematically shown by the dashed line output of the modulator 26 in FIG. 1, to an exit angle such that the laser beam is not passed by the optic elements 36-34-38 to the ink plane 43.

The specific laser printing mechanism, as more fully described in the above identified copending patent applications, in essence involves selective energy transfer from the modulated laser beam to the ink 43. In particular, if a sufficient quantity of laser energy impinges upon a localized area of the ink, the ink at that point leaves the carrier 42 and is deposited at the proximate location on the paper surface 44. The ink transfer process is understood to involve vaporization of at least a portion of the ink transferred, although a particular understanding of the ink transfer mechanism is not required for present purposes.

To reproduce the graphic information on the document original 40 then, the modulated laser beam horizontally sweeps across the ink surface 43 in a repetitive series of horizontal scan lines while either the paper surface 44 or the horizontal scan lines are slightly vertically displaced so that successive horizontal scan lines do not coincide. During any single sweep as the modulated laser beam traverses across the ink surface 43, ink is selectively displaced onto the paper 44 in accordance with the scanned printed matter of the original document. Thus the original image is reproduced on the paper 44, while a negative thereof is produced on the inked carrier 42. Clearly, changing the logic of the gate 24 would allow a negative of the original image to be produced on the paper 44 and a positive image to be produced on the inked carrier 42.

A reasonably fixed amount of laser energy is required to displace a given amount of ink from a given spot of the surface 43 onto the paper 44. Thus, the laser scanning rate must be sufficiently slow such that the energy transferred to the ink as a result of the integrative (or product) effect of the laser beam power with respect to the time that the beam is present within a localized area of the ink surface 43 is sufficiently great to cause the ink there present to transfer when printing is required. The printing speed constraint imposed by the available amount of laser beam power is the overall speed limiting constraint for the printing system, as it is possible to scan the original document and to effect the various required modulation and optical functions required for printing more rapidly than is required for the maximum printing speed permitted by the laser beam energy requirement for transferring ink.

Further to the above, it is observed that the maximum laser beam scanning rate for the FIG. 1 printing arrangement (absent the beam deflecting structure 60 considered in detail below) must be sufficiently slow such that the beam can effect continuous black printing if dictated by the contents of the original document. Thus, energy transferred from the laser beam to the ink, which is a function of the product of the laser beam power and the effective exposure time, at all points along the beam trace on the ink surface 43 must necessarily be sufficient to transfer ink to the paper 44.

As a basic precept of the present invention, the heretofore constant beam sweep speed is variable as the beam is swept along each line trace. In particular, the beam dwells at selected ink locations where printing is required and if, e.g., a black line is to be printed, then the beam is caused to dwell at closely spaced ink locations, rapidly moving between adjacent dwell points. Little or no printing is possible between contiguous ink transfer locations by reason of the relatively rapid beam sweep speeds over such intermediate areas.

The reproduced image is thus of the form of selectively positioned, closely spaced dots which are visually integrated by the limited resolution of direct human perception into a solid appearing line or area. By so enhancing the amount of laser beam energy transferred to given ink areas during a line scan, energy transfer from the laser beam to the ink there located is facilitated, and permissible printing speed is increased vis-a-vis constant speed beam sweeping for a laser of given average power output capability. If X is the fraction of the beam energy directed or diffracted by the modulator into the dwell spot on the ink area, and the scan rate on the ink is at velocity V in the absence of dwell and is, effectively, V' in the presence of dwell, then the enhancement-effectiveness of the laser power is approximately equal to $XV/V'$. Thus, if $X = 0.75$ and $V' = V/3$, then the enhancement is equal to $(0.75)(3) = 2.25$. That is, the required laser beam power is reduced by approximately 55 percent over that otherwise required for a given printing rate. This variation in the beam sweep speed is referred to herein as beam "dithering."

With the foregoing general principles in mind, reference is again made to FIG. 1, wherein beam deflecting apparatus 60 is employed to dither the laser beam, i.e., to vary the beam sweep rate across the ink surface 43 as discussed above. To this end a beam deflector 62, e.g., an electro-acoustic device, is employed to selectively and cyclically vary the angle of incidence of that portion of the diffracted laser beam which is deflected with respect to the scan wheel 34. More specifically, during printing, the dither in deflected laser beam sweep velocity along the ink surface 43 which is effected by the deflector 62 is advantageously made equal in magnitude (or nearly so) and opposite in direction from that sweep velocity on the ink surface 43 caused by the operative rotating scan wheel reflecting facet, such that the beam is essentially stationary on the ink surface 43 and is impinging upon a particular ink area to facilitate beam energy transfer to the ink. Correspondingly, in the intervals between printing areas, the beam deflection caused by the deflector 62 sweeps the beam across the ink surface 43 in the same direction as that caused by the scan wheel rotation, the laser beam thus moving across the ink surface 43 rapidly to reach the next intended ink transfer point. The average line scan rate corresponds to that due only to the rotation of the scan wheel 34, printing being possible, however, only at discrete ink transfer locations during times at which there is little or no relative movement of the beam with respect to the ink surface 43.

The acousto-optic beam deflector 62 has the property, if used in the so-called Bragg angle mode, of diffracting a portion of the input laser beam to an exit angle ($\theta$) measured with respect to the incident beam direction determined by the wave length of the laser radiation, the modulator material, and the instantaneous frequency ($f$) of the modulator drive energy supplied to a control terminal thereof, i.e., $\theta = kf$, where $k$ is a device constant. In the present invention, it is the diffracted portion of the laser beam which is used to effect printing. Accordingly, drive energy supplied by a power amplifier 64 to the beam deflector 62 is varied in frequency from an initial value to a final value in such a direction as to tend to cause the diffracted portion of the laser beam incident at the ink surface 43 to stay fixed at desired ink transfer points despite the effect caused by rotation of the scan wheel 34 during printing, the frequency of the drive energy returning to its initial value thereafter, which results in a deflection of the beam on the ink surface 43 in a like direction as that caused by rotation of the scan wheel 34.

To this end, a gated oscillator 70 is turned on by the output of the quantizer 31 during the times when printed matter is detected on the document original 40, and when printing is therefore desired. During the period when such printed matter is detected, a repetitive series of pulses is produced by the oscillator 70. As described hereinbelow, each such pulse generates a printed spot on the reproduction surface 44.

Each pulse from the oscillator 70 causes a ramp generator 72 to supply a triangular type output waveform to a voltage controlled oscillator 74. The ramp generator 72 may comprise an integrator for integrating the pulsed output of the oscillator 70, or may comprise a triggered sweep circuit.

Accordingly, the voltage controlled oscillator 74 supplies drive energy, for example, radio frequency energy, which varies in frequency from a first value to a second value. The RF signal is passed by a gate 66 and the amplifier 64 to the control port of the deflector circuit 62. As described above, such frequency variations acting in concert with the rotating scan wheel facets cause the point on the ink surface 43 at which the laser beam is incident to be stationary when printing is being effected and to rapidly advance along the ink surface 43 at the speed produced by the scan wheel along when printing is not desired.

The above described structure and beam dithering mode of operation will become more clear with respect to the waveforms of FIGS. 2A—2G which characterize functioning of the FIG. 1 arrangement. FIG. 2A depicts a typical analog waveform produced by the detector 28, and represents printed matter sensed on the document original 40. The quantizer 31 produces the output of FIG. 2B, attaining one of its two binary levels as the analog voltage of FIG. 2A either exceeds or is less than a black-white discrimination level 27.

Prior to the time $a$ in FIGS. 2A–2G, white is being sensed by the detector 28 and thus the quantizer has a low output potential which blocks the oscillator 70. Accordingly, (except when a negative image is being produced on ink surface 44) no pulses are supplied prior to the time $a$ by the oscillator 70 (see FIG. 2C and the expanded replica thereof, FIG. 2D). During such time, no output is produced by the ramp generator 72(FIG. 2E). The output of the voltage controlled oscillator 74 is thus of constant frequency and no time varying change in beam deflection is effected prior to the time $a$ by the beam deflector 62. Therefore, prior to the time $a$ in FIGS. 2F and 2G, the actual laser beam sweep rate (a solid curve 82 of FIG. 2F) across the ink surface 43 corresponds to the nominal sweep rate (dashed curve 84 in FIG. 2F) produced by the rotating scan wheel 34. The position of the beam during the laser beam line sweep (solid line 89 in FIG. 2G prior to the time $a$) thus follows the nominal dashed line 88 which would normally obtain simply by reason of the rotating scan wheel 34.

During the interval between the times $a$ and $b$ in FIGS. 2A and 2B, black printed matter is detected on the original document 40 and printing is thus required on the print surface 44. The output of the quantizer 31 enables the oscillator 70 which produces a series of output pulses, synchronized to the transition at $a$, during the interval $a$–$b$ (FIGS. 2C and 2D), and also during all other black, printing intervals $c$–$d$, $e$–$f$, $g$–$h$, and so forth. An expanded replica of the first two pulses $a$—$a'$ and $a''$—$a'''$ of FIG. 2C are shown in FIG. 2D.

During each pulse of FIG. 2D, the ramp generator 72 generates a triangular shaped waveform which produces a corresponding frequency variation at the output of the voltage controlled oscillator 74. This time varying drive signal is applied by gate 66 and amplifier 64 to the deflector 62. Accordingly, during the period $a$—$a'$ the deflector 62 shifts the diffraction angle of the diffracted portion of the laser beam at a rate shown by the dashed-dotted curve 86 of FIG. 2F which in effect at ink surface 43 is equal and opposite to the sweeping rate caused by the scan wheel 34 (dashed curve 84). The net laser beam sweep speed (solid curve 82 of FIG. 2F) is thus zero (or some small value). Accordingly, during the period $a—a'$ shown in FIG. 2G, the beam position is constant at the ink plane 43 thus facilitating ink transfer and producing a printed spot or area on the paper 44.

Figure 2G:
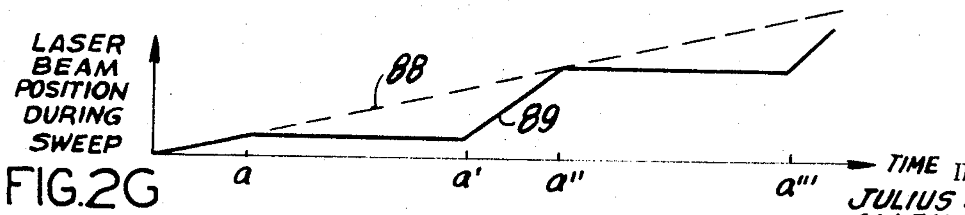

During the following interval $a'a''$, the voltage controlled oscillator is restored to its initial output frequency, thus causing a beam deflection (curve 86 of FIG. 2F) at the ink surface 43 in the same direction as that caused by scan wheel 34 (curve 84). Accordingly, the net deflection of the beam across the ink 43 proceeds much more rapidly than the average rate 84 during this interval. As shown in FIG. 2G, the beam is advanced to a nominal position dictated by scan wheel deflection only by the time $a''$. By reason of the rapid translation of the beam across the ink surface 43 during the period $a'—a''$, the beam is not intended due to energy limitations to cause printing at such times.

Similar system operation occurs for the second and all succeeding output pulses of the pulse train generated during each printing interval — e.g., that during the interval *a–b* of FIG. 2C. Printing for each black interval thus proceeds in the form of a sequence of spaced black dots or areas having an unprinted spacing therebetween. By providing a sufficiently high pulse repetition frequency at the output of the gated oscillator 70 relative to the rotational speed of the wheel 34, the interval between adjacent dots may be made sufficiently small such that printing appears continuous to the human eye. Since the beam is stationary (or relatively so depending upon the desired system parameters) during printing, beam energy is efficiently utilized, and printing may proceed at a relatively rapid rate of speed and, in particular, at a rate exceeding that for a continuous sweep rate system.

In accordance with one aspect of the present invention, the output from the voltage controlled oscillator 74 may be selectively blocked by the gate 66 from reaching the deflector 62. Thus, during those intervals when the scan wheel 34 is in position for active document scanning and printing, the gate 66 may be enabled by a logic gate 68 and the output of active print position sensing apparatus 46. Such apparatus 46 is disclosed in a copending application of Melvin Cook, Ser. No. 217,107 filed concurrently herewith, and, in brief, comprises a light source 48 and a photodetector 50 to signal the beginning of active printing. A one shot circuit 54, such as a monostable multivibrator, is provided to enable the gate 66 via the AND gate 68 for a timed interval corresponding to the duration of active printing. Correspondingly, the blanking-unblanking signal provided by the one shot circuit 54 effectively shuts down the deflector circuit 60 during those intervals when useful printing is not being conducted.

Moreover, it is observed that there is no requirement for two beam angle deflector structures 26 and 62 in the FIG. 1 arrangement. The modulator 26 may be deleted, and the output of the quantizer 31 connected to a second input of the AND gate 68 (such connection being shown by a dashed line in the drawing). Accordingly, during active scanning and printing, but when no printed material is sensed on the original document 40, the low output from the quantizer 31 blocks the AND gate 68 and thereby also the gate 66. Drive energy is therefore removed from the deflector 62 at such times by the disabled gate 66 such that the laser beam is not provided at an angle to the optics 36 and the scan wheel 34, at which printing can be effected, i.e., the laser beam does not impinge upon the pigment surface 43. Thus, the requisite uninked area (no print) is effected at the reproduction surface 44.

The above considered arrangement, and the ramifications thereof, are merely illustrative of the principles of the present invention. Numerous modifications and adaptations thereof will be readily apparent to those skilled in the art without departing from the spirit and scope of the present invention. Thus, for example, beam dithering may be effected by selectively supplementing a fixed laser beam of a sub-printing threshold amplitude by a cyclically, spatially swept additional beam. Printing is thus possible (depending upon the video information) when the energy of the two beams is additive on the ink surface.

It should also be clear that the material transferred from the surface 42 by reason of absorbing energy from the laser beam need not be a material in the class which includes inks, dyes and pigments but can be a material that allows subsequent preferential absorption of an ink, dye or pigment or which can otherwise be developed from the latent image formed by the transfer process to form a visual image.

What is claimed is:

1. In combination in a laser printing arrangement, laser means for supplying an output laser beam, modulator means for modulating said laser output beam in accordance with graphic information, an ink bearing surface, beam sweeping means for repetitively sweeping said modulated laser beam across said ink bearing surface, and laser beam deflector means operatively disposed between said laser and said ink bearing surface for selectively deflecting a portion of said laser beam in a direction opposite to that effected by said beam sweeping means.

2. A combination as in claim 1 wherein said laser beam deflector means comprises a beam deflector including beam receiving and beam exciting ports and a beam deflector control port, and control port exciting means for exciting said beam deflector control port with a control excitation which alternately monotonically increases and monotonically decreases in its deflector controlling parameter for controlling the angle of deflection of the deflected portion of said laser output beam.

3. A combination as in claim 2 wherein said laser beam deflector comprises an acousto-optic deflector.

4. A combination as in claim 3 wherein said deflector control port exciting means comprises a voltage controlled oscillator.

5. A combination as in claim 4 further comprising triangular waveform generating means connected to said voltage controlled oscillator whose output frequency depends directly on the magnitude of the voltage applied to it.

6. A combination as in claim 4 wherein said modulator means includes gate means disposed intermediate said voltage controlled oscillator and said laser beam deflector means, and means for operating said gate means in accordance with graphic information.

7. A combination as in claim 1 further comprising means for scanning an original document, and means for controlling said modulator means in accordance with the output of said scanning means.

8. A combination as in claim 7 wherein said scanning means includes quantizing means.

9. A combination as in claim 1 further comprising means synchronized with said optical sweeping means for controlling said laser beam deflecting means.

10. A combination as in claim 1 wherein said modulator means comprises means for controlling said laser beam deflecting means.

11. A combination as in claim 1 further comprising printing surface means disposed proximate to said ink bearing surface.

12. In combination in a laser printing arrangement, laser means for supplying an output laser beam, a printing material surface, laser beam deflector means operatively disposed between said laser and said printing material surface, and beam sweeping means for repetitively sweeping the portion of the output laser beam deflected by said laser beam deflector means across said printing material surface, said laser beam deflector means deflecting a portion of said laser beam over said printing material surface in a direction opposite to that effected by said beam sweeping means.

13. A combination as in claim 12 wherein said laser beam deflector means comprises a beam deflector including beam receiving and beam exciting ports and a beam deflector control port, and control port exciting means for exciting said beam deflector control port with a control excitation which alternately monotonically increases and monotonically decreases in its deflector controlling parameter for controlling the angle of deflection of the deflected portion of said laser output beam.

14. A combination as in claim 13 wherein said laser beam deflector comprises an acousto-optic deflector, and wherein said deflector control port exciting means comprises a voltage controlled oscillator.

15. A combination as in claim 14 further comprising triangular waveform generating means connected to said voltage controlled oscillator whose output frequency depends directly on the magnitude of the voltage applied to it.

16. A combination as in claim 14 further comprising modulator means for modulating said output laser beam including gate means disposed intermediate said voltage controlled oscillator and said laser beam deflector means, and means for operating said gate means in accordance with graphic information.

17. A combination as in claim 16 further comprising means for scanning an original document, and means for controlling said modulator means in accordance with the output of said scanning means.

18. A combination as in claim 17 wherein said scanning means includes quantizing means.

19. A combination as in claim 16 wherein said modulator means comprises means for controlling said laser beam deflecting means.

20. A combination as in claim 12 further comprising means synchronized with said optical sweeping means for controlling said laser beam deflecting means.

21. A combination as in claim 12 wherein said printing material surface comprises a marking material adapted for spatial dislocation responsive to energy absorption.

22. A combination as in claim 21 further comprising printing surface means disposed proximate to said printing material surface for receiving dislocated marking material.

23. A combination as in claim 12 wherein said printing material surface comprises means for forming a latent image responsive to incident laser beam energy adapted for forming by further processing a visual image.

* * * * *